United States Patent Office 3,347,641
Patented Oct. 17, 1967

3,347,641
BUFFER COMPOSITION HAVING HIGH
MAGNESIA TO ALUMINA RATIO
Takeru Higuchi, Madison, Wis., and Foo Song Hom, Detroit, Mich., assignors to Warner-Lambert Pharmaceutical Company, Morris Plains, N.J., a corporation of Delaware
No drawing. Filed Mar. 22, 1963, Ser. No. 267,331
5 Claims. (Cl. 23—315)

This invention relates to novel buffer compositions. More particularly, this invention relates to novel buffer compositions which are capable of neutralizing large quantities of acid rapidly without significant change in pH, and which are useful in the treatment of gastric hyperacidity.

The novel compositions of this invention are hydrated materials having approximately the composition, exclusive of water of hydration, represented by the formula $8MgO \cdot Al_2O_3 \cdot SO_3$.

It is believed that the novel compositions of this invention are in fact new hydrated compounds having the formula, exclusive of water of hydration, $$8MgO \cdot Al_2O_3 \cdot SO_3$$

and that these compounds have no differences in composition other than differing amounts of water of hydration.

The compounds of this invention can be prepared by mixing an aqueous solution of an alkaline metal aluminate with a source of magnesium ions and a source of sulfate ions in amounts such that the resulting mixture has a pH of 7 to about 12.5, an atomic ratio of magnesium to aluminum of at least 4:1, and an atomic ratio of sulfur to aluminum of at least 1:2. Upon its mixture there is formed a precipitate of the desired compound.

It is important to maintain an atomic ratio of magnesium to aluminum of at least 4:1 and preferably in excess of that ratio in order to assure the precipitation of the desired compound. If the atomic ratio of magnesium to aluminum in the reagents is allowed to fall below 4:1, the precipitate contains not only the desired compound but also a compound of the formula (on the anhydrous basis) $4MgO \cdot Al_2O_3 \cdot SO_3$. As the atomic ratio of magnesium to aluminum in the reagents is reduced, the proportion of the desired novel compound of this invention becomes less.

It is also essential to maintain the pH of the solution in the range of about 7.0 to about 12.5. If the pH is allowed to exceed about 12.5 to 13, sulfate does not precipitate and the precipitate instead is a magnesium aluminate.

The desired precipitate forms most readily when the pH is below 10.5. Water soluble bases such as sodium hydroxide and acids such as acetic acid, sulfuric acid and hydrochloric acid may be added as necessary to adjust the pH to the desired value.

The alkali metal aluminate reagent is preferably either sodium aluminate, $NaAl(OH)_4$, or potassium aluminate, although the other alkali metal aluminates may be used if desired. Aluminate solutions containing various amounts of free alkali may be satisfactorily used.

Any water soluble magnesium salt, such as magnesium sulfate, magnesium acetate, magnesium chloride, magnesium nitrate, and the like, may be used. Magnesium sulfate, which is readily available as the heptahydrate and commonly called Epsom salts, is the preferred magnesium salt because of its availability and low cost. This salt serves both as a source of magnesium ions and a source of sulfate ions. The large excess of sulfate ions over the amount required has no deleterious effects. Insoluble magnesium compounds such as magnesium hydroxide and magnesium carbonate may also be used. Such compounds may require partial neutralization with acid to bring the pH within the permissible range.

Where a magnesium salt other than magnesium sulfate is used, it is necessary to add an additional compound to serve as a source of sulfate ions. This source of sulfate ions should be water soluble, and is preferably an alkali metal sulfate, such as sodium sulfate or potassium sulfate. Sulfuric acid may be used to furnish all or part of the sulfate ions, provided the quantity added does not reduce the pH below about 7.

The concentrations of these reagents can be varied widely. For example, the compound of this invention has been successfully precipitated from solutions containing anywhere from 1.80 to 100 millimols of sodium aluminate per liter; greater or smaller concentrations may also be used if desired. The concentration of magnesium salt may be any amount desired, provided the atomic ratio of magnesium to aluminum is at least 4:1 and preferably in excess of that value. Stated in terms of millimols of magnesium salt, this corresponds to at least four millimols of a magnesium salt having either a monovalent or divalent anion per millimols of sodium aluminate. The sulfate ion concentration can be any desired value so long as it is at least one-half of the concentration of aluminum ion in millimols per liter.

The precipitate may be readily recovered by conventional means such as centrifugation or filtration, followed by washing and drying.

The novel products of this invention are superior as antacids for the treatment of gastric hyperacidity. They are characterized by extraordinarily high acid consuming power per unit weight of antacid material, a high buffer pH, the capacity to neutralize excess acid very rapidly to the buffer pH, and a long shelf-life with little or no loss of acid consuming power with time. These products possess the unique feature of being particularly stable when employed as aqueous suspensions with little or no loss in acid consuming power.

The products of this invention are also useful in other applications, e.g., various chemical reactions, where it is desired to maintain a buffered pH slightly on the acid side (e.g., about 4 to 4.5).

This invention will now be described with reference to the specific embodiments as illustrated by the following examples.

EXAMPLE 1

Twelve grams (0.052 mol) of Epsom salt, $$MgSO_4 \cdot 7H_2O$$

is dissolved in one liter of water. To this solution is added with vigorous stirring 50 ml. of 0.2 M sodium aluminate containing approximately 20% excess sodium hydroxide (NaOH=0.04 molar). Sodium hydroxide or acetic acid is added at the outset as required so that the final pH is from 8 to 10. The slurry is warmed to 50° C., and stirred for two hours. The slurry is then allowed to settle, and the supernatant solution is removed by decantation. The solid material is recovered as a wet paste by filtration. The precipitate has the composition $8MgO \cdot Al_2O_3 \cdot SO_3$ plus water of hydration.

The following uniform procedures are observed in Examples 2 and 3 which follows:

Distilled water, and 0.1 M aqueous solutions of sodium sulfate, acetic acid or sodium hydroxide, as indicated, magnesium acetate, and sodium aluminate, are measured accurately in the order listed into a 120 milliliter polyethylene bottle having a polyethylene lined screwcap. The total liquid volume in all runs is 100 milliliters. The amount of each reagent in millimols per liter of soution (which is the same as the number of milliliters of 0.1 M solution of the reagent) is indicated in the tables in each of the examples. The amount of water is sufficient to give a total liquid volume of 100 ml. The bottles are capped and rotated at 30° C. and 30 r.p.m. for a period of at least five days. The temperature is maintained by a constant temperature bath overnight to allow the precipitate to settle out and to leave a clear supernatant liquid. The screwcap is carefully dried and then removed, and the pH of the supernatant liquid is measured by means of a glass electrode.

The following analytical procedures are used to determine the amounts of magnesium, aluminum, and sulfate in the supernatant:

*Magnesium.*—A 5 ml. to 25 ml. sample of the supernatant is pipetted into 125 ml. Erlenmeyer flask. Sufficient distilled water is added to give a total volume of 45 ml. To this is added 5 ml. of a pH 10 buffer solution. The solution. The solution is heated on a steam bath to 60° C. After heating, 10 to 15 milligrams of "Eriochrome Black T" indicator is added. The complex was back titrated with EDTA until all traces of red tint just disappear and a permanent blue color appears. A 0.01 M solution of EDTA is used. One milliliter is equivalent to 0.2432 mg. of magnesium.

*Sulfate.*—Sulfate is precipitated as barium sulfate according to the procedure of W. J. Blaedel et al., "Elementary Quantitative Analysis," Evanston, Illinois, Row, Peterson & Co., 1957, page 220.

EXAMPLE 2

The uniform procedure described above is used in this example, the amount of sodium sulfate being 0.5 millimol (50 ml. of 0.1 M solution) and the amount of sodium aluminate being 0.18 millimol (18 ml. of 0.1 M solution) in all runs. The amounts of acetic acid and magnesium acetate added in each run, the pH in that run, and the quantity of magnesium in solution, are indicated in Table I below.

TABLE I

| Magnesium Acetate Added, millimols/liter | Magnesium in Solution, millimols/liter | | |
|---|---|---|---|
| | pH=8.0 | pH=8.5 | pH=9.0 |
| 5.00 | 0.830 | 0.630 | 0.440 |
| 7.50 | 1.87 | 1.87 | 1.60 |
| 10.0 | 2.80 | 2.80 | 2.65 |
| 12.5 | 6.70 | 6.30 | 4.60 |
| 15.0 | 9.10 | 8.40 | 7.60 |

A magnesium material balance shows that virtually none of the magnesium up to an addition of 4 millimols per liter goes into solution, that about ½ of the amount between 4 and 10 millimols per liter goes into solution, and that all of the magnesium added in excess of 10 millimols per liter goes into solution. In other words, magnesium is precipitated up to an addition of 10 millimols per liter, and after that, there is no further precipitation of magnesium. This can be explained by the fact that there are two solid phases present when the total magnesium addition is between 4 and 10 millimols per liter. These two solid phases are $4MgO \cdot Al_2O_3 \cdot SO_3$ and $8MgO \cdot Al_2O_3 \cdot SO_3$. As additional magnesium ion is added, the former compound is converted to the latter. When the magnesium ion addition reaches 10 millimols per liter, all the precipitate is in the form of $8MgO \cdot Al_2O_3 \cdot SO_3$, and no further precipitation of magnesium takes place.

EXAMPLE 3

This example shows precipitation of sulfate by the addition of magnesium acetate. The amounts of sodium sulfate, magnesium acetate, and sodium aluminate added in each run are shown in Table II below. The pH was about 8.5 to 9.

TABLE II

| Amount of Reagent Added, millimols/liter | | $Na_2SO_4$ | Sulfate ion in Solution, millimols/liter |
|---|---|---|---|
| $Mg(OAc)_2$ | $NaAl(OH)_4$ | | |
| 1.50 | 1.80 | 2.50 | 2.45 |
| 3.50 | 1.80 | 2.50 | 2.10 |
| 8.50 | 1.80 | 2.50 | 1.84 |
| 1.50 | 1.80 | 5.00 | 4.85 |
| 3.50 | 1.80 | 5.00 | 4.44 |
| 8.50 | 1.80 | 5.00 | 4.44 |
| 15.00 | 1.80 | 5.00 | 4.26 |
| 1.50 | 1.80 | 10.00 | 10.05 |
| 3.50 | 1.80 | 10.00 | 9.56 |
| 8.50 | 1.80 | 10.00 | 9.36 |
| 1.50 | 3.60 | 5.00 | 5.00 |
| 4.00 | 3.60 | 5.00 | 4.32 |
| 8.00 | 3.60 | 5.00 | 3.49 |
| 1.50 | 5.10 | 2.50 | 2.49 |
| 5.00 | 5.10 | 2.50 | 1.51 |
| 9.00 | 5.10 | 2.50 | 0.57 |
| 15.00 | 5.10 | 2.50 | 0 |
| 1.50 | 5.10 | 5.00 | 4.87 |
| 5.00 | 5.10 | 5.00 | 3.98 |
| 9.00 | 5.10 | 5.00 | 2.82 |
| 15.00 | 5.10 | 5.00 | 2.18 |
| 1.50 | 5.10 | 10.00 | 9.94 |
| 5.00 | 5.10 | 10.00 | 9.13 |
| 10.00 | 5.10 | 10.00 | 7.87 |
| 15.00 | 5.10 | 10.00 | 7.27 |

As the data in Table II show, there is virtually no decrease in sulfate concentration in the supernatant, indicating no precipitation of sulfate, until the amount of magnesium acetate added is at least 1.5 millimols per liter. Thereafter, further addition of magnesium acetate causes sulfate to precipitate in the amount of 1 millimol for every 4 millimols of magnesium acetate added, until the depletion of sulfate is 0.5 millimol for every millimol of sodium aluminate present in the solution. Thereafter further additions of magnesium acetate have no effect on the concentration of sulfate in solution, which means that no further sulfate is being precipitated. From this it is apparent that a compound containing one mol of sulfate (expressed as $SO_3$) for every two mols on the aluminum compound is being precipitated. Since two mols of aluminum compound are equivalent to one mol of $Al_2O_3$, the precipitate contains one mol of $SO_3$ for every mol of $Al_2O_3$. The precipitate initially formed contains one mol of sulfate for every four mols of magnesium compound, as indicated by the removal of one millimol of sulfate from the solution for every four millimols of magnesium acetate added. As we have seen in Example 1, the addition of excess magnesium ions in excess of an atomic ratio of Mg:Al of 4:1 produces a precipitate containing four atoms of magnesium for every atom of aluminum (in other words, 8 mols of MgO per mol of $Al_2O_3$) it is evident that the ratio of magnesium to sulfate in the precipitate increases from 4:1 to 8:1 while the atomic ratio of aluminum to sulfate remains constant at 2:1, once the minimum value of sulfate in solution has been reached.

The precipitates in Examples 2 and 3 are filtered, washed and dried.

The products of this invention can be administered orally to a person suffering from gastric hyperacidity. They may be subdivided into fine particle size and admixed with inert carriers as is well known to those skilled in the art. These products can also be used as buffers for aqueous solutions simply by addition of the buffer composition to the solution.

While we have described our invention with reference to specific embodiments thereof, it is understood that this invention is limited only by the scope of the appended claims.

What is claimed is:
1. Compounds having the formula $8MgO \cdot Al_2O_3 \cdot SO_3$ plus water of hydration.
2. A process for forming a hydrated compound having the formula $8MgO \cdot Al_2O_3 \cdot SO_3$ plus water of hydration, which comprises mixing an alkali metal aluminate, a source of magnesium ions and a source of sulfate ions in an aqueous solution having a pH of 7 to 12.5, the atomic ratio of magnesium to aluminum being at least 4:1 and the atomic ratio of sulfur to aluminum being at least 1:2.

3. The process of claim 2 wherein the pH of the solution is 7 to 10.5.

4. The process of claim 2 wherein magnesium sulfate is the source of both magnesium ions and sulfate ions.

5. The process of claim 2 wherein magnesium acetate is the source of magnesium ions and an alkali metal sulfate is the source of sulfate ions.

References Cited

UNITED STATES PATENTS

| | | | |
|---|---|---|---|
| 2,413,184 | 12/1946 | Lalande | 23—52 |
| 2,923,660 | 2/1960 | Hallmann | 23—14 X |
| 3,017,324 | 1/1962 | Beekman | 167—55 |
| 3,099,524 | 7/1963 | Grossmith | 23—315 |

FOREIGN PATENTS 239,547  6/1962  Australia.

MILTON WEISSMAN, *Primary Examiner.*

MAURICE A. BRINDISI, OSCAR R. VERTIZ,

*Examiners.*

R. M. DAVIDSON, *Assistant Examiner.*